(12) United States Patent
Alliss

(10) Patent No.: US 8,863,395 B2
(45) Date of Patent: Oct. 21, 2014

(54) STRING TRIMMER HEAD ASSEMBLY WITH PIVOTING LINE MOUNTS

(76) Inventor: George E. Alliss, Bladenboro, NC (US)

( * ) Notice: Subject to any disclaimer, the term of this patent is extended or adjusted under 35 U.S.C. 154(b) by 358 days.

(21) Appl. No.: 13/237,930

(22) Filed: Sep. 20, 2011

(65) Prior Publication Data

US 2012/0066915 A1 Mar. 22, 2012

Related U.S. Application Data

(60) Provisional application No. 61/384,450, filed on Sep. 20, 2010.

(51) Int. Cl.
*A01D 34/73* (2006.01)
*A01D 34/416* (2006.01)

(52) U.S. Cl.
CPC .................................. *A01D 34/4166* (2013.01)
USPC ................... 30/276; 30/329; 56/12.7

(58) Field of Classification Search
USPC .............. 30/276, 347, 329, 122, 334, DIG. 5; 56/12.7
See application file for complete search history.

(56) References Cited

U.S. PATENT DOCUMENTS

| | | | | |
|---|---|---|---|---|
| 4,856,194 A | * | 8/1989 | Lee | 30/276 |
| 6,052,974 A | * | 4/2000 | Harb | 56/12.7 |
| 6,119,350 A | * | 9/2000 | Sutliff et al. | 30/276 |
| 7,743,511 B2 | * | 6/2010 | Jerez | 30/276 |
| 7,913,401 B2 | * | 3/2011 | Iacona | 30/275.4 |
| 2007/0214655 A1 | * | 9/2007 | Arnetoli | 30/276 |
| 2008/0034724 A1 | | 2/2008 | Jerez | |
| 2009/0038163 A1 | * | 2/2009 | Jerez et al. | 30/276 |

* cited by examiner

*Primary Examiner* — Stephen Choi
(74) *Attorney, Agent, or Firm* — Merek, Blackmon & Voorhees, LLC

(57) ABSTRACT

A trimmer head assembly for use on a vegetation cutting machine. The trimmer head assembly has a housing. The housing has a top surface, bottom surface, and at least two recessed areas there between. Pivot posts are disposed within each of the recessed areas. An anchor disc is disposed around each pivot post. The anchor disc is free to rotate around the pivot post within a range. Each anchor disc has two trimmer line channels extending through it. The two trimmer line channels are joined by an open edge groove that runs along one edge. A length of trimmer line is provided for each anchor disc. Each length of trimmer line has a first end that extends through the first of the trimmer line channels, a second end that extends through the second of the trimmer line channels and a bend that seats in the open edge groove.

17 Claims, 4 Drawing Sheets

STRING TRIMMER HEAD ASSEMBLY WITH PIVOTING LINE MOUNTS

RELATED APPLICATIONS

This application is a continuation-in-part of U.S. Provisional Patent Application No. 61/384,450, entitled String Trimmer Head Assembly With Pivoting Line Mounts, filed Sep. 20, 2010.

BACKGROUND OF THE INVENTION

1. Field of the Invention

In general, the present invention relates to string trimmer heads that rotate to cut vegetation. More particularly, the present invention relates to the mounting system that is used to connect lengths of trimmer line to the rotating trimmer head.

2. Prior Art Description

The prior art is replete with string trimmers that spin lengths of trimmer line to cut vegetation. String trimmers have trimmer heads that are rotated by either a gasoline motor or an electric motor. Trimmer line extends from the rotating head. The trimmer line typically passes through eyelets that are formed in the trimmer head. When the trimmer line rotates and strikes vegetation, the string bends back toward the trimmer head. This causes a shearing action at the point where the trimmer string exits the trimmer head. Consequently, the trimmer line often wears and breaks at the point where the trimmer line exits the trimmer head. When this occurs, the remaining trimmer line may retreat completely into the trimmer head. If the trimmer head contains an internal supply spool of trimmer line, then the trimmer head must then be disassembled to again extend the trimmer line out of the trimmer head.

In an attempt to reduce the occurrence of trimmer line breaking at the trimmer head interface, trimmer heads have been invented that minimize the shear forces experienced at the trimmer head interface. This is done by connecting the trimmer line to anchor elements that are pivotably connected to the trimmer head. In this manner, when the trimmer line strikes an object and bends back, its mounting anchor pivots and reduces the shear forces. Such prior art trimmer head devices are exemplified by U.S. Patent Application Publication No. 2008/0034724 to Jerez, entitled Powered Disk Preferably With Oscillateable Trimmer Line Hour Mounts.

A problem associated with such prior art trimmer heads is that the anchors that engage the trimmer line are exposed to the cutting environment. Such prior art trimmer line anchors have teeth, sharp edges and other protrusions that enable the anchors to engage the trimmer line. These protrusions have a tendency to catch vegetation and other debris as the trimmer head spins. Once enough vegetation becomes entangled in the anchors, the anchors are no longer free to pivot. The shear forces return and the trimmer line again tends to break at the trimmer head interface.

A need therefore exists for a trimmer line mount that is free to pivot on a mounting head, yet provides no protruding elements that can be immobilized by debris. This need is met by the present invention, as described and claimed below.

SUMMARY OF THE INVENTION

The present invention is a trimmer head assembly for use on a powered vegetation cutting machine. The trimmer head assembly has a housing that is rotated by the vegetation cutting machine. The housing has a top surface, bottom surface, and at least two recessed areas disposed between the top surface and the bottom surface. A pivot post is disposed within each of the recessed areas.

An anchor disc is disposed around each pivot post within each of the recessed areas. The anchor disc is free to rotate around the pivot post within a predetermined range. Each anchor disc has two trimmer line channels extending through its body. The two trimmer line channels are joined by an open edge groove that runs along one edge of the body.

A length of trimmer line is provided for each of the anchor discs. Each length of trimmer line has a first end that extends through the first of the trimmer line channels, a second end that extends through the second of the trimmer line channels and a bend that seats in the open edge groove. During operation, the trimmer line and the anchor discs are able to pivot while rotating with the housing. This reduces shear forces that act to wear and break the trimmer line.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the technology embodied by the present invention can be added to many trimmer head designs, the embodiment illustrated shows a simple form of the trimmer head having only two trimmer lines and a simple disc-shape housing. This embodiment is selected in order to set forth the best mode contemplated for the invention. The illustrated embodiment, however, is merely exemplary and should not be considered a limitation when interpreting the scope of the appended claims.

Figure 1:
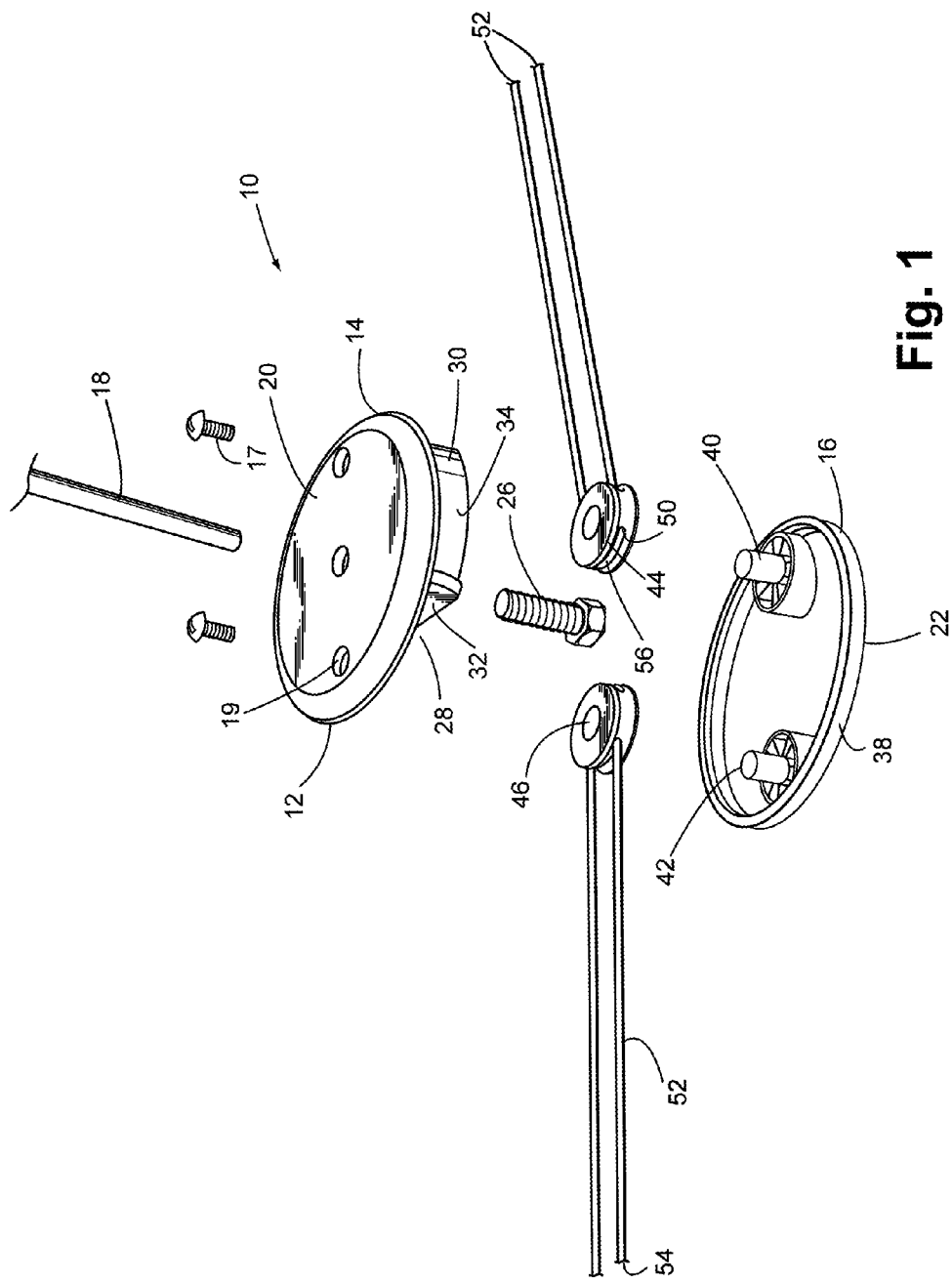
FIG. 1 is an exploded perspective view of the exemplary embodiment of a trimmer head assembly.
Figure 2:
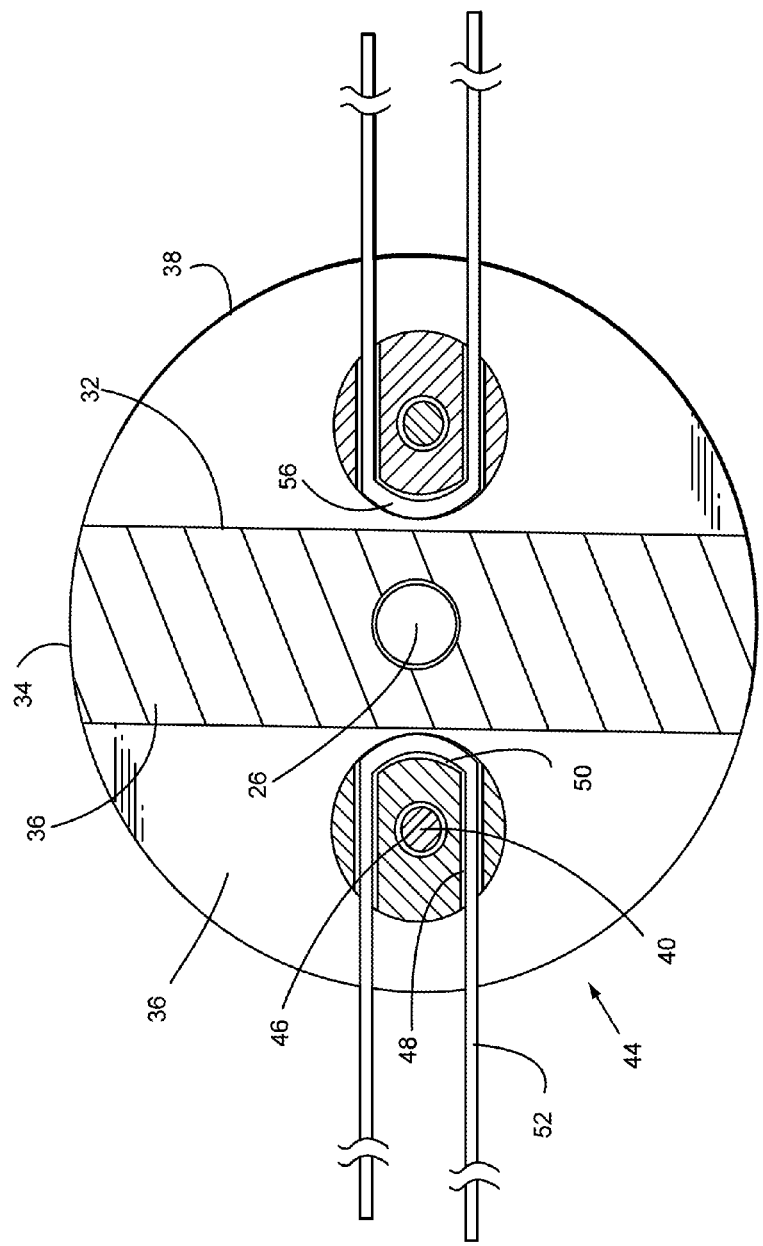
FIG. 2 is a cross-sectional view of the embodiment of FIG. 1.

Referring to both FIG. 1 and FIG. 2, a trimmer head assembly 10 is shown. The trimmer head assembly 10 has a housing 12 that contains an upper section 14 and a lower section 16 that are joined together by screws 17. The screws 17 are set into screw holes 19, so as not to protrude from the housing 12. The resulting housing 12 is generally disc-shaped, having a smooth top surface 20 a smooth bottom surface 22 that are separated by a peripheral side edge 24.

The upper section 14 of the housing 12 attaches to the drive shaft 18 of a trimmer machine using a mounting bolt 26. Consequently, the upper section 14 of the housing 12 turns with the drive shaft 18, therein causing the entire housing 12 to rotate when the trimmer machine is in operation.

The upper section 14 of the housing 12 has a top cap plate 28. The top surface of the top cap plate 28 is the top surface 20 of the entire housing 12. A spacer block 30 projects downwardly from the underside of the top cap plate 28. The spacer block 30 has two straight side edges 32 and two curved side edges 34. All the edges 32, 34 have the same height. The curved side edges 34 align with the curved periphery of the top cap plate 28, therein creating the side edges 24 of the overall housing 12.

The straight side edges 32 of the spacer block 30 do not follow the curvature of the top cap plate 28 and therefore create two large recessed areas 36 where the housing 12 does not have a peripheral side edge 24. The two recessed areas 36 are diametrically opposed on opposite sides of the housing 12.

The lower section 16 of the housing 12 has a bottom cap plate 38. The bottom surface 22 of the bottom cap plate 38 is also the bottom surface 22 of the overall housing 12. Two pivot posts 40 extend upwardly from the bottom cap plate 38. Threaded bores 42 are tapped into the tops of the pivot posts 40. The pivot posts 40 align with screw holes 19 in the top cap plate 28 of the upper section 14 of the housing 12. The screws 17 pass into the screw holes 19 and engage the threaded bores 42 in the pivot posts 40, thus connecting the upper section 14 and the lower section 16 of the housing 12 together.

When the upper section 14 and the lower section 16 of the housing 12 are joined together, the pivot posts 40 are located in the center of each of the recessed areas 36 on either side of the spacer block 30.

Figure 3:
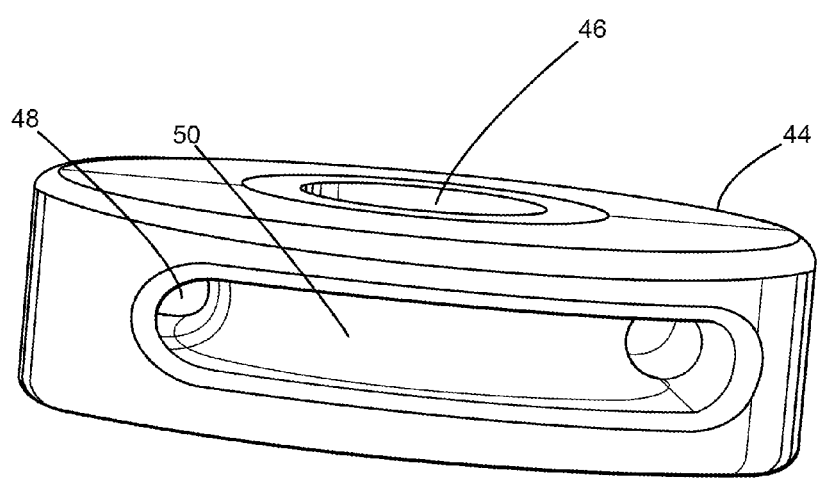
FIG. 3 is a side view of the anchor disc component of the exemplary embodiment.
Figure 4:
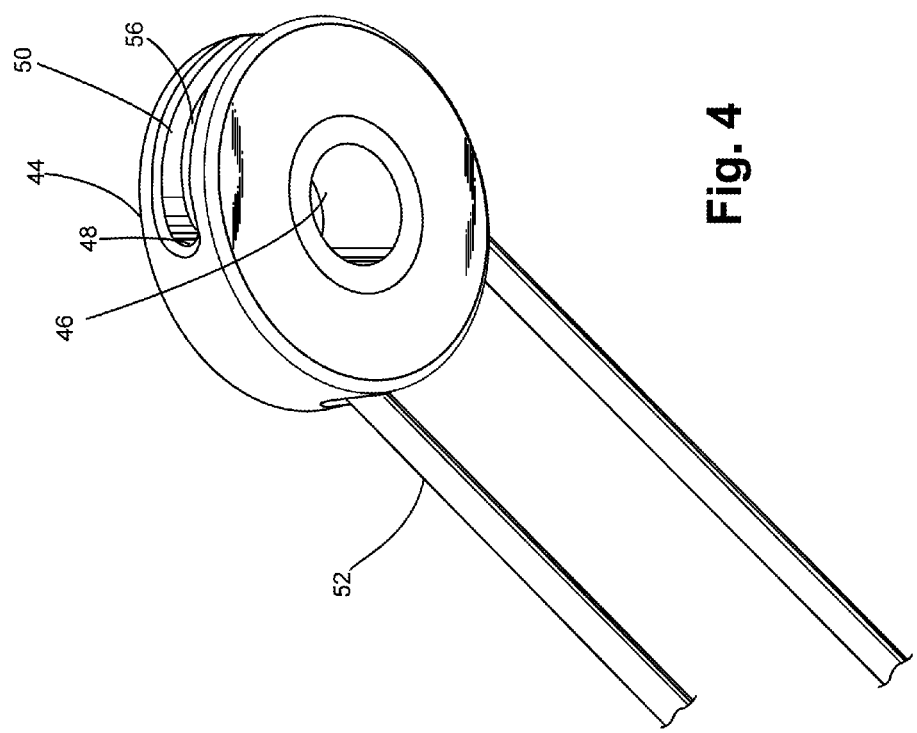
FIG. 4 is a perspective view of an anchor disc engaging a length of trimmer line.

Referring now to FIG. 3 and FIG. 4 in conjunction with FIG. 1 and FIG. 2, it can be seen that two anchor discs 44 are provided. Each anchor disc 44 is annular in shape and defines a central opening 46 that is sized to freely receive a pivot post 40.

Two parallel channels 48 extend into the anchor disc 44 on either side of the central opening 46. The parallel channels 48 run in a plane that is perpendicular to the longitudinal axis of the central opening 46. The parallel channels 48 are physically isolated from the central opening 46. That is, the parallel channels 48 do not interconnect with the central opening 46. However, the two parallel channels 48 are interconnected by an open edge groove 50. The open edge groove 50 is formed along the periphery of the anchor disc 44 and extends from one parallel channel 48 to the other.

A length of trimmer line 52 is provided. The length of trimmer line 52 has two free ends 54. The length of trimmer line 52 is turned at a bend 56 into a U-shape so that the two free ends 54 are positioned next to each other. The free ends 54 of the trimmer line 52 are inserted through the open edge groove 50 and into the two parallel channels 48. The bend 56 of the trimmer line 52 seats within the open edge groove 50. The two free ends 54 of the trimmer line 52 extend through and out the parallel channels 48. Consequently, the two free ends 54 of the trimmer line 52 extend from the anchor disk 44 in the same general direction. The size of the open edge groove 50 and the diameters of the parallel channels 48 are made to be only slightly larger than the diameter of the trimmer line 52. Consequently, when the trimmer line 52 is inserted into an anchor disc 44, it is prevented from inadvertently exiting the anchor disc 44 by contact friction.

The central opening 46 within each anchor disc 44 is placed around a pivot post 40. The central opening 46 is slightly larger than is the pivot post 40. Consequently, the anchor discs 44 are free to rotate around the pivot posts 40. The only limitation to the rotation of the anchor discs 44 comes from the trimmer line 52 contacting the spacer block 30 within the confines of the recessed areas 36. This limits the rotation of the anchor discs 44 and the trimmer line 52 to approximately 180 degrees.

In operation, the ability of the anchor discs 44 to rotate enables the extending trimmer line 52 to pivot about its mounting point. This eliminates much of the shear forces experienced by the trimmer line 52. Furthermore, since the recessed areas 36 are empty and the anchor discs 44 have rounded exteriors, there is very little structure around which debris can cling. As a result, centrifugal force keeps debris out of the recessed areas 36 and the anchor discs 44 remain free to rotate during operation.

Should a length of trimmer line 52 wear and break, no disassembly is required. The old trimmer line is pulled out of an anchor disc 44. A new length of trimmer line 52 is then bent into a U-shape and inserted into the open edge groove 50 and the parallel channels 48 of that anchor disc 44. The new length of trimmer line 52 is then seated in the open edge groove 50 and the trimmer head assembly 10 is again ready for use.

It will be understood that the embodiment of the present invention illustrated is merely exemplary and that a person skilled in the art can make many modifications to the embodiment shown. For example, more than two anchor discs 44 may be present on a trimmer head assembly 10. Likewise, the channels 48 in the anchor disc 44 can be varied in position so that the trimmer line 52 diverges out of the anchor discs 44 at an angle, rather than parallel. Furthermore, the spacer block 30 can be tapered to enable the anchor discs 44 to rotate more than 180 degrees. All such obvious variations and modifications are intended to be included within the scope of the present invention.

What is claimed is:

1. A trimmer head assembly, comprising:
   a housing having a upper housing section, lower housing section,
   said upper housing section connected to said lower housing section to form a central divider therebetween, and at least two recessed areas defined by said upper housing section and said lower housing section and divided by said central divider;
   at least one pivot post disposed within each of said recessed areas;
   an anchor disc rotatingly mounted on each said at least one pivot post within each of said recessed areas, each said anchor disc being free to rotate about said pivot post; and
   wherein each said anchor disc consists essentially of a solid disc defining a central, axial opening for receiving the pivot post, defining two channels extending through the disc, and an open edge groove circumferentially extending about the outer edge of the disc and connecting at each end of the groove to a respective one of the two defined channels.

2. The assembly according to claim 1, wherein each said anchor disc central opening has a longitudinal axis, and wherein said pivot post extends through said central opening enabling said anchor disc to rotate about said pivot post.

3. The assembly according to claim 1, wherein said two channels and said open edge groove extend through said anchor disc in a plane perpendicular to said longitudinal axis.

4. The assembly according to claim 3, wherein said two channels and said open edge groove do not open into said central opening.

5. The assembly according to claim 3, wherein said two channels are parallel.

6. The assembly according to claim 1, further including a length of trimmer line having a first end and an opposite second end, wherein said length of trimmer line extends through a first of said two channels, curves around said open edge groove and extends back through a second of said two channels, and wherein said open edge groove has a diameter just large enough to pass the diameter of the trimmer line.

7. The assembly according to claim 1, wherein said upper section of said housing is connected to the shaft of a trimmer and said lower section of said housing is joined to the trimmer shaft indirectly only through said upper housing, wherein at least some of said mechanical fasteners pass into said pivot post.

8. The assembly according to claim 1, wherein said open edge groove has an inner radial wall formed having a constant radius from the central axis of the disc along the entire length of the axial groove from the intersection of the groove with one channel at one groove end to the other of the two channel at a second groove end.

9. The assembly according to claim 8, wherein said two channels and said groove are defined within the disc as circular cross-sectional passages.

10. The assembly according to claim 1, wherein said open edge groove has an inner wall extending from a first of said two channels to a second of said two channels, and wherein said entire inner wall is curved along an arc having a constant radius from the central axis of the disc.

11. A trimmer head assembly, comprising:
 a housing having recessed areas defined between an upper housing section and a lower housing section;
 at least one pivot post disposed within each of said recessed areas;
 an anchor disc mounted on each said at least one pivot post within each of said recessed areas, wherein each said anchor disc comprises two channels defined extending therethrough for guiding trimmer line therethrough and that both lead into respective ends of a common open edge groove for receiving a trimmer line thereon and a central, axial opening for receiving the pivot post therethrough; and
 a mechanical fastener connecting the upper and lower housing sections.

12. The assembly according to claim 11, wherein each said anchor disc central opening has a longitudinal axis, wherein said pivot post extends through said central opening enabling said anchor disc to rotate about said pivot post.

13. The assembly according to claim 12, wherein said two channels and said open edge groove extend through said anchor disc in a plane perpendicular to said longitudinal axis.

14. The assembly according to claim 13, wherein said two channels are parallel.

15. The assembly according to claim 13, wherein said open edge groove has an inner radial wall formed having a constant radius from the central axis of the disc along the entire length of the axial groove from the intersection of the groove with one channel at one groove end to the other of the two channel at a second groove end.

16. The assembly according to claim 11, wherein said open edge groove has an inner radial wall formed having a constant radius from the central axis of the disc along the entire length of the axial groove from the intersection of the groove with one channel at one groove end to the other of the two channel at a second groove end.

17. The assembly according to claim 16, wherein said two channels and said groove are defined within the disc as circular cross-sectional passages.

* * * * *